United States Patent [19]

Kraft

[11] 4,285,676
[45] Aug. 25, 1981

[54] MECHANICAL BELT TENSIONER CONSTRUCTION

[75] Inventor: Derald H. Kraft, Canton, Ohio
[73] Assignee: Dyneer Corporation, Canton, Ohio
[21] Appl. No.: 104,439
[22] Filed: Dec. 17, 1979
[51] Int. Cl.³ .............................................. F16H 7/12
[52] U.S. Cl. .................................... 474/135; 267/155
[58] Field of Search ............... 474/115, 117, 118, 135; 248/292.1, 597; 267/155, 168

[56] References Cited

U.S. PATENT DOCUMENTS

| | | | |
|---|---|---|---|
| 1,186,982 | 6/1916 | Hall ..................................... | 474/135 |
| 1,670,914 | 5/1928 | Tessky ................................. | 474/135 |
| 2,739,778 | 3/1956 | Krone et al. ........................ | 267/155 X |
| 2,995,936 | 8/1961 | Heinzmann ......................... | 267/155 |
| 3,136,170 | 6/1964 | Murray ............................... | 474/135 |
| 3,834,246 | 9/1974 | McGilp ............................... | 474/135 |
| 3,975,965 | 8/1976 | Speer .................................. | 474/135 |
| 4,165,466 | 8/1979 | Stikkers ............................. | 474/117 X |

FOREIGN PATENT DOCUMENTS

| | | | |
|---|---|---|---|
| 570635 | 12/1957 | Italy ......................................... | 267/155 |
| 66787 | 5/1914 | Switzerland ............................. | 474/135 |

*Primary Examiner*—Lawrence J. Staab
*Attorney, Agent, or Firm*—Frease & Bishop

[57] ABSTRACT

A tensioning device for maintaining a predetermined amount of tensioning force on an endless drive belt for a vehicle accessories drive system. A housing is mounted in a fixed position on the vehicle engine adjacent the drive belt. A lever is pivotally mounted on a shaft which is located within the housing and extends generally radially outwardly from the housing and is adapted to move in a belt tensioning direction. A first pair of cylindrical, torsional coil springs is telescopically mounted on the shaft, with the springs being located one on each side of the lever. A second pair of cylindrical, torsional coil springs is telescopically concentrically mounted on the shaft and surrounds the first spring pair. One end of each spring is attached to the housing with the other spring ends being attached to the lever. The spring pairs are placed in torsion and bias the lever in the belt tensioning direction. An idler pulley is mounted on the end of the lever and is moved into tensioning engagement with the drive belt by the torsion springs, or alternately one of the vehicle accessories is mounted on the end of the lever for tensioning the drive belt which is engaged by the accessory pulley. The tensioner construction enables a large tensioning force to be obtained from a relatively small, compact, simple spring arrangement by using three or more torsional springs.

9 Claims, 9 Drawing Figures

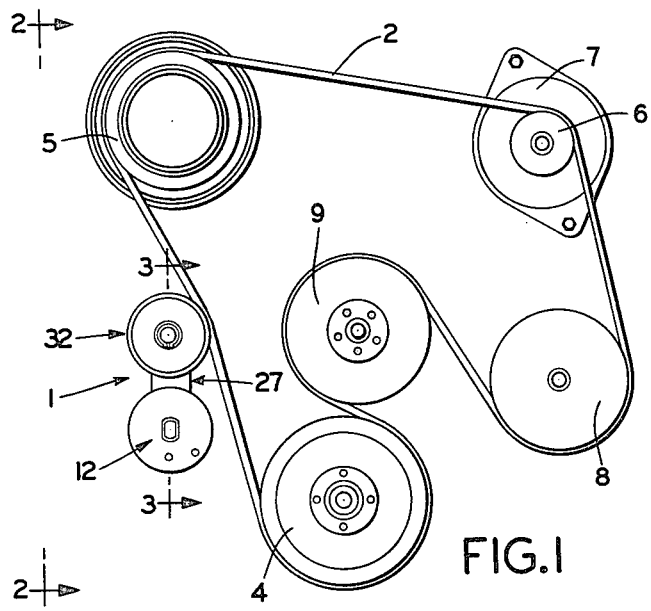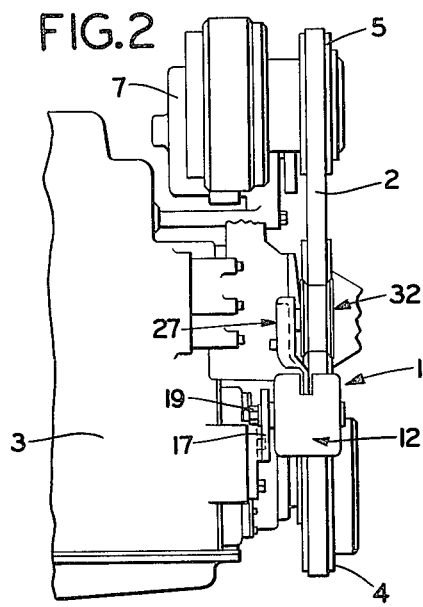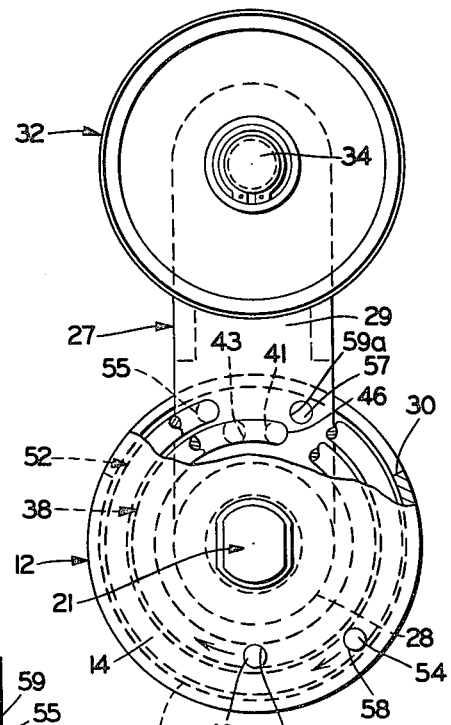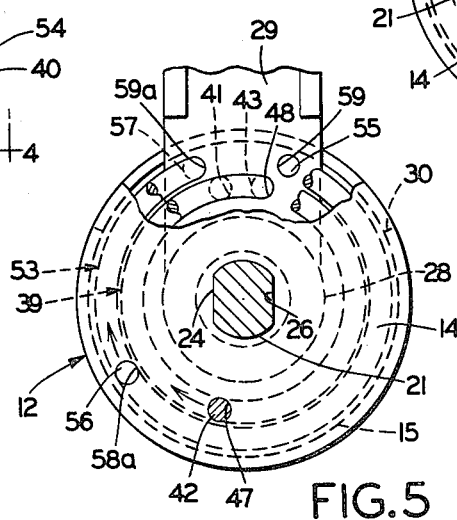

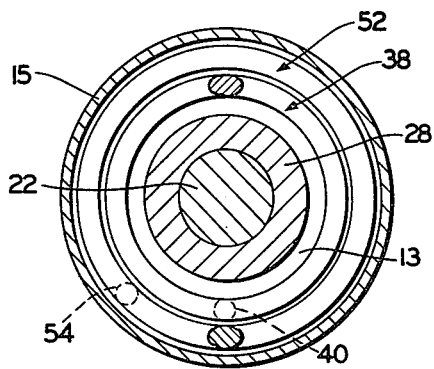
FIG. 6
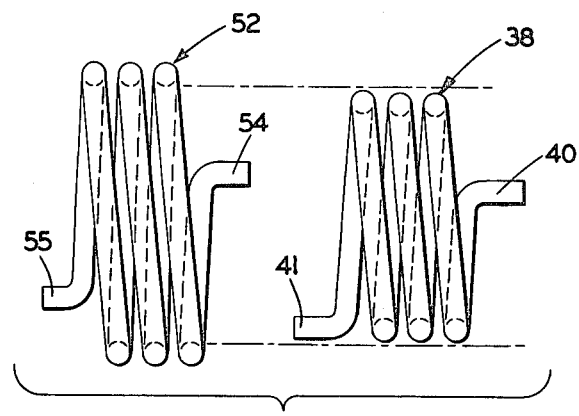
FIG. 7
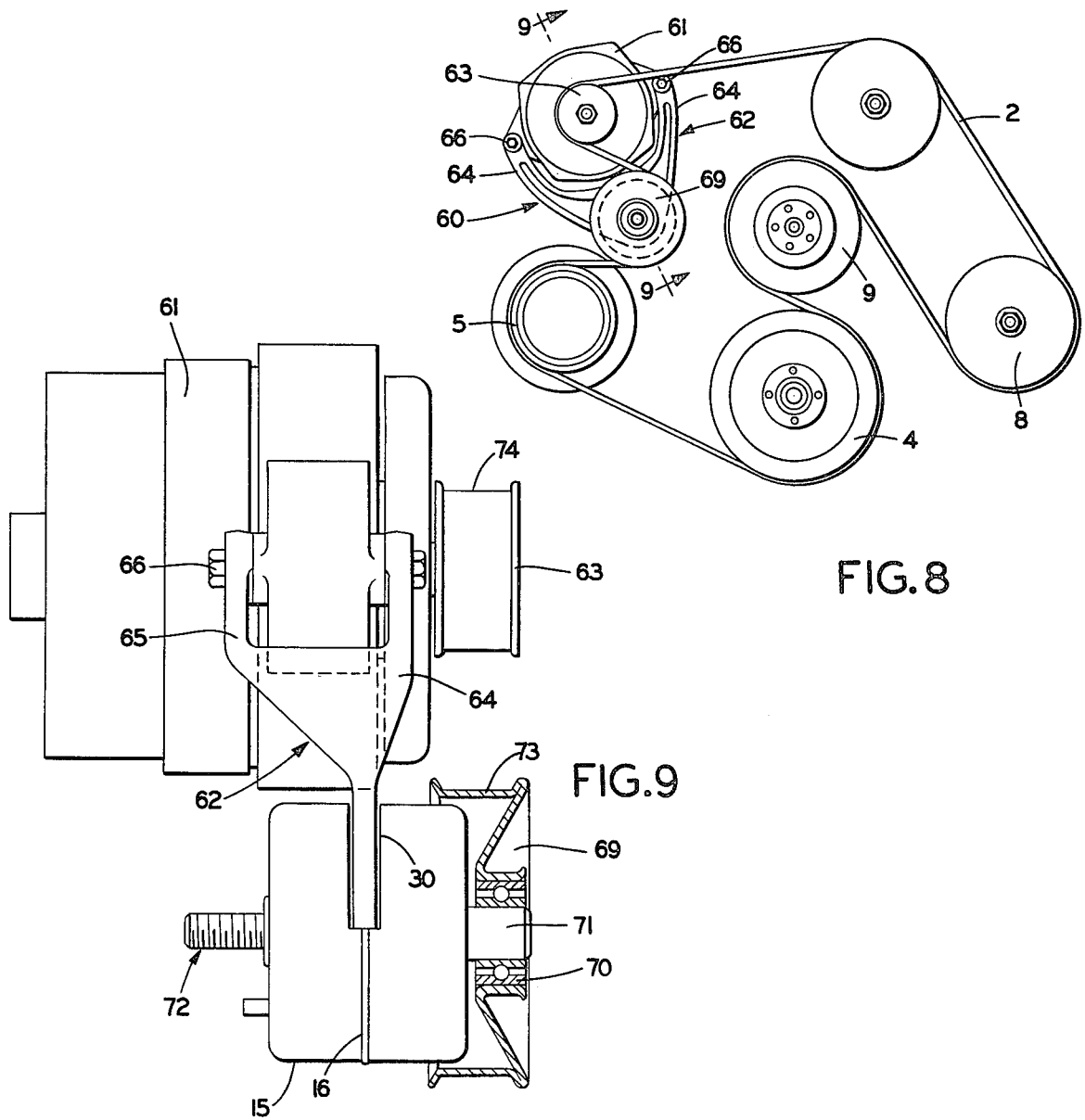
FIG. 8
FIG. 9

MECHANICAL BELT TENSIONER CONSTRUCTION

BACKGROUND OF THE INVENTION

1. Field of the Invention

The invention relates to belt tensioning devices, and in particular to mechanical spring-actuated belt tensioning devices for use with the endless drive belts of the drive systems for vehicle accessories. More particularly, the invention relates to a relatively simple and compact belt tensioner operated by a plurality of torsional springs, which achieves and maintains a predetermined tensioning force on the endless drive belt by engagement of the drive belt by an idler pulley or by pivotally moving one of the vehicle accessories in a belt tensioning direction.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length of the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use compression or tension springs for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733 and 3,965,768. Other various spring-actuated devices use the biasing force of a tension or compression spring in combination with hydraulic actuated members for regulating the amount of tensioning force applied to the belt, depending on whether the engine is running or shut off. Examples of these combination hydraulic and spring-actuated tensioning devices are shown in U.S. Pat. Nos. 2,051,488, 3,142,193, and 4,077,272.

Due to the relatively large number of different vehicles, and the different drive belt and accessory arrangements therefor, it is difficult to provide a tensioner construction which can be adapted for use in nearly all of these various installations. Also, it is desirable that such a belt tensioner can exert the necessary tensioning force and have a compact, rugged and inexpensive construction to minimize both original equipment cost and installation cost, and which reduces or eliminates maintenance.

The above-listed examples of spring-actuated belt tensioners use a coil spring which is placed in compression or tension for applying the belt tensioning force. It is difficult to achieve high tensioning forces with springs which are placed in tension or compression in a relatively small compact unit due to the size of the springs required to develop relatively large tensioning forces.

One known belt tensioner construction, shown in U.S. Pat. No. 3,924,483, uses a torsional spring for pivotally moving one of the vehicle accessories to achieve the desired tensioning force. There is one other known belt tensioner construction which uses a pair of torsional coil springs for pivotally moving a lever and idler pulley into belt tensioning engagement which provides a relatively simple, economical and compact unit. This latter tensioning device uses two torsional coil springs, each being mounted on a respective side of the lever and engaged with the lever and housing for biasing the intervening lever in a belt tensioning direction. This tensioning device is believed generally satisfactory for many belt tensioning applications. However, certain applications require a greater tensioning force than that which can be obtained with this known torsional spring device without increasing the size of the unit to use larger torsional springs.

Some vehicle manufacturers desire a belt tensioning device which tensions the belt by pivotally moving one of the vehicle accessories, whereas other manufacturers prefer a tensioning device which is mounted as a complete unit on the engine and automatically tensions the drive belt by direct engagement therewith without pivotally mounting one of the vehicle accessories.

Therefore, the need has existed for a belt tensioner construction which is of a simple, rugged and compact design, which can be modified easily by adding additional coil torsional springs to achieve various belt tensioning loads without materially increasing the size of the device, and which permits flexibility in installation by pivotally mounting one of the vehicle accessories for tensioning the drive belt which is operatively engaged with said accessory, or else by directly engaging the belt by an idler pulley which is biased into belt tensioning engagement by the force of the torsional springs.

There is no known belt tensioning construction of which I am aware which imparts a generally constant predetermined tensioning force on an endless drive belt by moving an idler pulley into tensioning engagement with the belt or by pivotally moving one of the vehicle accessories, by the use of three or more coil torsional springs which are mounted in a telescopic relationship with respect to each other within a compact, rugged housing construction.

SUMMARY OF THE INVENTION

Objectives of the invention include providing a mechanical belt tensioner construction which is actuated by three or more coil springs placed in torsion and connected at one end to a housing which is mounted on the engine adjacent the drive belt, and which are connected at the other ends to the base of a lever pivotally mounted within the housing, and in which the coil springs are telescopically, concentrically mounted with respect to each other within the housing; providing such a belt tensioner which tensions the drive belt by movement of a pulley against the belt, in which the pulley is either an idler pulley mounted on the extended end of the lever or is the operating pulley of one of the vehicle accessories which is mounted on the extended end of the lever; providing such a belt tensioner which can develop various tensioning forces by adding or subtracting coil torsional springs within the housing in which the lever is pivotally mounted; and providing such a belt tensioner construction which is of an extremely rugged and compact design and relatively inexpensive with respect to many known tensioning devices, which achieves the stated objectives in an effective and safe manner, and which solves problems and satisfies needs existing in the art.

These objectives and advantages are obtained by the improved belt tensioner construction for automatically tensioning an endless drive belt of the drive system for vehicle accessories, the general nature of which may be stated as including a housing adapted to be mounted in a fixed position on a vehicle engine adjacent the drive belt; a shaft mounted within the housing; lever means pivotally mounted on the shaft and extending generally radially outwardly from the housing; pulley means mounted on the lever means and engageable with the drive belt for applying a tensioning force on said belt when the lever means is moved in a belt tensioning direction; first and second inner cylindrical coil springs telescopically mounted on the shaft in an axially spaced relationship with respect to each other on respective sides of the lever means; and a third cylindrical coil spring having an internal diameter complementary to the outer diameter of the first coil spring telescopically mounted with respect to the shaft and said first spring and concentric thereto, said springs being subjected to torsion and connected to the housing and lever means biasing the lever means in the belt tensioning direction.

BRIEF DESCRIPTION OF THE DRAWINGS

A preferred embodiment of the invention-illustrative of the best mode in which applicant has contemplated applying the principle-is set forth in the following description and shown in the accompanying drawings, and is particularly and distinctly pointed out and set forth in the appended claims.

FIG. 1 is a diagrammatic view looking toward the front of an engine illustrating an endless drive belt operatively connected to and driving the vehicle accessories with the improved belt tensioner in tensioning engagement with the drive belt;

FIG. 2 is a left-hand end view looking in the direction of arrows 2—2, FIG. 1;

FIG. 3 is an enlarged sectional view of the improved belt tensioner construction taken on line 3—3, FIG. 1;

FIG. 4 is a right-hand end elevational view of the improved belt tensioner construction looking in the direction of arrows 4—4, FIG. 3;

FIG. 5 is a fragmentary sectional view taken on line 5—5, FIG. 3;

FIG. 6 is a sectional view taken on line 6—6, FIG. 3;

FIG. 7 is an exploded elevational view of one pair of the telescopically mounted inner and outer torsional coil springs removed from their housing;

FIG. 8 is a diagrammatic view, similar to FIG. 1, showing a modified form of the improved belt tensioner construction in which one of the vehicle accessories is pivotally mounted for tensioning the endless drive belt which is engaged with the operating pulley of the accessory; and FIG. 9 is an enlarged sectional view of the modified belt tensioner construction removed from its mounting bracket, taken on line 9—9, FIG. 8.

Similar numerals refer to similar parts throughout the drawings.

DESCRIPTION OF THE PREFERRED EMBODIMENT

Referring to FIG. 1 of the drawings, the improved belt tensioner construction is indicated generally at 1 and is shown in tensioning engagement with an endless drive belt 2 of a belt drive system for the vehicle accessories. The drive system consists of a plurality of belt pulleys or sheaves having configurations and diameters determined by their associated engine accessory components and locations relative to each other. The various pulleys are supported on their respective engine components, which in turn are mounted on an engine 3 in a usual manner known in the art. Preferably, belt 2 operates in a single vertical plane, as shown in FIG. 2, to eliminate binding and skewing of the belt.

The engine accessories drive system, as shown in FIG. 1, consists of a main driving pulley 4 which is operatively connected to the main drive shaft of the engine, a pulley 5 which is operatively connected to the air conditioning motor, a pulley 6 which is operatively connected to an alternator 7 which provides the electrical power for the engine, a pulley 8 which is operatively connected to the engine air pump, and a pulley 9 which is operatively connected to the engine water pump. This engine accessory configuration is by way of example only and may vary depending upon the particular vehicle engine and manufacturer thereof.

Tensioner 1, shown particularly in FIGS. 3–6, includes a cylindrical housing 12 formed by a pair of spaced, parallel, circular end walls 13 and 14 and a cylindrical side wall 15. Housing 12 preferably is formed of sheet metal or similar rigid material and may be assembled by two cup-shaped sections which are welded together at 16. Housing 12 is adapted to be mounted on an engine mounting bracket 17 by a nut 19 and a lock washer 20 which are mounted on the threaded end 18 of a shaft, indicated generally at 21.

Shaft 21 preferably is an integral one-piece member having a smooth cylindrical-shaped central portion 22 terminating at both ends in flat-sided areas 23 and 24. Flat-sided areas 23 and 24 are seated in complementary-shaped openings 25 and 26 formed in housing end walls 13 and 14, respectively, whereby housing 12 is secured against rotation on shaft 21. Portions of the metal in flat-sided shaft areas 23 and 24 are peened against side walls 13 and 14 to firmly secure housing 12 to shaft 21.

A lever, indicated generally at 27, is pivotally mounted on cylindrical portion 22 of shaft 21 within housing 12 by a cylindrical hub 28 which is telescopically, slidably mounted on portion 22. Lever 27 includes a radially, outwardly extending lever arm 29 which projects through an arcuate-shaped slot 30 formed in cylindrical side wall 15 of housing 12. An idler pulley 32 is rotatably mounted by a bearing 33 on the extended end of a stub shaft 34 which is mounted on and projects outwardly from the outer end of lever arm 29. Pulley 32 is of a usual sheet metal construction having a belt-receiving groove 35 formed in the outer periphery thereof.

A pair of similar cylindrical-shaped, helical springs, circular in cross section, and indicated generally at 38 and 39 (FIGS. 3 and 7), are telescopically mounted on cylindrical hub 28 of lever 27. Spring 38 is located between lever arm 29 and housing wall 13 with spring 39 being located between lever arm 29 and housing wall 14 (FIG. 3). Lever arm 29 terminates in a radially extending annular rib portion 31 which extends about the middle of hub 28 against which the inner endmost convolutions of springs 38 and 39 abut.

Springs 38 and 39 terminate in bent ends 40–41 and 42–43, respectively, which project in a generally outwardly axial direction. Spring ends 40 and 41 extend through complementary-shaped holes 45 and 46 formed in housing end wall 13 and lever arm 29, respectively (FIGS. 3–6). Spring ends 42 and 43 extend through complementary-shaped holes 47 and 48 formed in housing end wall 14 and lever arm 29, respectively. Spring end 42 projects into another complementary-shaped hole 49 which is formed in engine mounting bracket 17 for aligning housing 12 thereon. Since springs 38 and 39 are similar, only spring 38 is shown in detail in FIG. 7.

In accordance with the invention, a second pair of cylindrical-shaped, helical springs, circular in cross section, indicated generally at 52 and 53, are telescopically mounted on cylindrical hub 28, and on inner springs 38 and 39, respectively. Springs 52 and 53 are similar to each other, and are similar to springs 38 and 39 except that springs 52 and 53 have a larger diameter than that of springs 38 and 39. As illustrated in FIG. 7, springs 52 and 53 have an internal diameter complementary to the outer diameter of springs 38 and 39 so that springs 38 and 39 will telescopically fit within springs 52 and 53, respectively, when mounted on hub 28.

Springs 52 and 53 terminate in axially extending bent ends 54 and 55 and 56 and 57, respectively. Spring ends 54 and 55 extend through complementary-shaped holes 58 and 59 formed in the housing end wall 13 and in lever arm 29, respectively. Spring ends 56 and 57 extend through complementary-shaped holes 60 and 61 formed in housing end wall 14 and lever arm 29, respectively.

The operation of improved belt tensioner construction 1 is easily understood from FIGS. 1 and 3. Tensioner 1 is mounted by bracket 17 on the vehicle engine closely adjacent drive belt 2. After mounting of tensioner 1 on bracket 17, lever 27 is manually rotated in a counterclockwise direction with respect to FIG. 1, or in a direction away from belt 2. Since the ends of springs 38–39 and 52–53 are fixed either to an end wall of housing 12 or to lever arm 29, this counterclockwise movement of lever arm 29 will place the springs in torsion. Upon release of lever arm 29, the springs will bias the lever in a clockwise position in attempting to return to their at-rest or unstressed condition. This movement will move idler pulley 32 in a belt tensioning direction and into belt tensioning engagement with belt 2 which is located within pulley groove 35, applying a predetermined tensioning force on the belt.

One of the main advantages of the invention is that various tensioning forces can be obtained easily and inexpensively by the use of more than two torsion springs as heretofore used, and by varying the effective moment arm of lever 27. In accordance with the invention, a single additional spring 52 may be added within housing 12 alone or in combination with a fourth spring 53 to achieve a predetermined tensioning force. The telescopic mounting of springs 52 and 53 on inner springs 38 and 39, which in turn are telescopically mounted on lever hub 28 and shaft portion 22, increases very little the size of housing 12. Furthermore, this particular multiple telescopically assembled spring arrangement enables more belt tensioning force to be obtained than with known spring tensioning arrangements.

If desired, the diameter of housing 12 can be increased and a fifth and sixth coil spring can be telescopically mounted over the two inner concentric spring pairs and placed in torsion to achieve an even greater tensioning force. However, the use of three or four coil springs of sufficient stiffness and size when placed in torsion, has been found to be adequate for obtaining the needed tensioning force for most belt tensioning applications.

A modified form of the improved belt tensioner construction is indicated generally at 60 and is shown in FIG. 8 tensioning drive belt 2. The arrangement shown in FIG. 8 is similar to that of FIG. 1 except that a vehicle accessory, such as an alternator 61, is mounted on the extended end of a lever 62 of tensioner 60 for tensioning the belt instead of moving an idler pulley into tensioning engagement with the belt, as in FIG. 1. The remaining vehicle accessories shown in FIG. 8 are similar to those described above with respect to FIG. 1, and therefore are not specifically set forth. Accordingly, belt tensioner 60 provides a unit which can be mounted on the vehicle engine at a variety of locations for tensioning belt 2 by pivotally mounting one of the engine components. Pivotal movement of alternator 61 will tension belt 2, since belt 2 is operatively engaged with alternator pulley 63.

Belt tensioner 60 is similar in nearly all respects with respect to tensioner 1 except that lever arm 29 and idler pulley 32 are replaced by lever arm 62. Lever arm 62 terminates in a pair of outwardly curved arms 64 which have U-shaped brackets 65 at the extended ends thereof for mounting alternator 61 thereon by bolts 66.

Depending upon the particular engine mounting arrangement with which modified tensioner 60 is to be used, an idler pulley 69 may be rotatably mounted by a bearing ring 70 on an extended end 71 of lever mounting shaft 72. Idler pulley 69 has a peripheral belt-receiving groove 73 which lies in the same vertical plane with pulley groove 74 of alternator pulley 63. This additional idler pulley 69 enables tensioner 60 to be placed at a variety of positions and locations on an engine for tensioning belt 2.

Lever arm 62 is biased in a belt tensioning direction by the same unique torsional spring arrangement described above with respect to belt tensioner 1. Therefore, the details of this spring arrangement are not shown nor described in detail with respect to tensioner 60.

Improved belt tensioners 1 and 60 provide a construction which is of an extremely simple, rugged and dependable design, which enables more force to be obtained than with compression and tension spring arrangements used in known prior tensioner constructions, and improves the advantages and achieves greater flexibility than the known belt tensioner, which uses only a pair of axially spaced torsional springs. Furthermore, tensioners 1 and 60 can be mounted at a variety of locations on the engine and can be formed as a part of the accessories drive system by pivotally mounting one of the accessories, or else can be mounted as a unit completely separate from the drive system and tension the drive belt by movement of an idler pulley into tensioning engagement with the belt.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the belt tensioner construction is constructed and used, the characteristics of the construction, and the advantageous, new and useful results obtained; the new and useful structures, devices, elements, arrangements, parts, and combinations, are set forth in the appended claims.

I claim:

1. A belt tensioner construction for automatically tensioning an endless belt of the drive system for vehicle accessories, said tensioner construction including:
   (a) a housing adapted to be mounted in a fixed position on a vehicle engine adjacent the drive belt;
   (b) a shaft mounted within the housing;
   (c) lever means pivotally mounted on the shaft and extending generally radially outwardly from the housing;
   (d) pulley means mounted on the lever means and engageable with the drive belt for applying a tensioning force on said belt when the lever means is biased in a belt tensioning direction;
   (e) first and second cylindrical coil springs telescopically mounted on the shaft in an axially spaced relationship with respect to each other on respective sides of the lever means, each of said coil springs terminating in a pair of ends, with one end of each coil spring being fixed to the housing and the other end of each coil spring being fixed to the lever means so that upon pivotal movement of the lever means in a direction opposite the belt tensioning direction builds up tension in said first and second springs biasing the lever means in the belt tensioning direction; and
   (f) a third cylindrical coil spring having an internal diameter complementary to the outer diameter of the first coil spring telescopically mounted with respect to the shaft and said first spring and concentric thereto, said third spring terminating in a pair of ends with one end being fixed to the housing and the other end being fixed to the lever means so that upon pivotal movement of the lever means in a direction opposite the belt tensioning direction builds up tension in said third spring biasing the lever means in the belt tensioning direction increasing the biasing forces asserted by the first and second coil springs on said lever means.

2. The belt tensioner construction defined in claim 1 in which a fourth cylindrical coil spring similar to the third coil spring is telescopically mounted on the second coil spring and has a pair of ends which are respectively connected to the housing and lever means and subjected to torsion when the lever means is moved in the direction opposite to the belt tensioning direction to increase the biasing force exerted on the lever means in the belt tensioning direction.

3. The belt tensioner construction defined in claim 1 in which the coil springs each have a cylindrical configuration and are circular in cross section.

4. The belt tensioner construction defined in claim 1 in which the pulley means includes a vehicle accessory mounted on an extended end of the lever means, and a pulley operatively engaged with said accessory and the drive belt for operating the accessory upon movement of the drive belt.

5. The belt tensioner construction defined in claim 4 in which the lever means terminates in a pair of outwardly extending arms, each of said arms terminating in a U-shaped bracket; and in which the vehicle accessory is mounted between said U-shaped brackets.

6. The belt tensioner construction defined in claim 1 in which each of the coil springs terminates in a pair of generally axially extending ends; and in which said spring ends project into a respective complementary-shaped opening formed in the lever means and the housing.

7. The belt tensioner construction defined in claim 6 in which one of the spring ends extends into an opening formed in an engine mounting bracket for aligning the housing on said bracket.

8. The belt tensioner construction defined in claim 1 in which the shaft is an integral one-piece member having a cylindrical central portion extending between a pair of flat-sided portions; in which the housing has a pair of end walls formed with axially aligned openings shaped complementary to the flat-sided portions of the shaft; and in which the flat-sided portions of the shaft are mounted in the housing end wall openings.

9. The belt tensioner construction defined in claim 1 in which the shaft has an end which extends outwardly beyond an end of the housing; in which an idler pulley is rotatably mounted on said shaft end; and in which said idler pulley and the pulley means lie in a common vertical plane.

* * * * *